United States Patent
Sanchez

(10) Patent No.: US 6,746,063 B1
(45) Date of Patent: Jun. 8, 2004

(54) DEVICE FOR SEPARATING, LIFTING AND MOVING ALUMINIUM SHEETS OR OTHER NON-FERROMAGNETIC MATERIAL

(76) Inventor: Albert Redo Sanchez, Carretera Castellvell, 14 E-43206 Reus (ES)

( * ) Notice: Subject to any disclaimer, the term of this patent is extended or adjusted under 35 U.S.C. 154(b) by 0 days.

(21) Appl. No.: 10/088,568

(22) PCT Filed: Jul. 19, 2000

(86) PCT No.: PCT/ES00/00258

§ 371 (c)(1),
(2), (4) Date: Jun. 18, 2002

(87) PCT Pub. No.: WO02/08100

PCT Pub. Date: Jan. 31, 2002

(51) Int. Cl.[7] .............................. B66C 1/04; B65H 3/16
(52) U.S. Cl. .................. 294/65.5; 271/18.1; 414/797.1
(58) Field of Search ..................... 294/65.5; 414/797.1; 271/18.1, 18.2; 335/285, 295

(56) References Cited

U.S. PATENT DOCUMENTS

| | | | |
|---|---|---|---|
| 1,716,602 A | 6/1929 | Ross | |
| 4,392,766 A | 7/1983 | Blunt | |
| 5,449,211 A | * 9/1995 | Monford, Jr. | ............... 294/65.5 |
| 5,651,541 A | * 7/1997 | Prime | ........................ 271/18.1 |

FOREIGN PATENT DOCUMENTS

| | | |
|---|---|---|
| DE | 3615186 A1 | 11/1987 |
| EP | 0 939 047 A1 | 2/1999 |
| JP | 03144252 | 11/1992 |

* cited by examiner

Primary Examiner—Dean J. Kramer

(57) ABSTRACT

Device for separating, lifting and transporting sheets of aluminium or other non-ferromagnetic material consisting of a spider attraction assembly provided with a series of blocks of magnets and with contact electrodes, which by way of the effects produced by Lorentz forces, together with the action of a series of vacuum pads, is provided with the capacity to attract sheets of aluminium.

2 Claims, 6 Drawing Sheets

Figure 1:
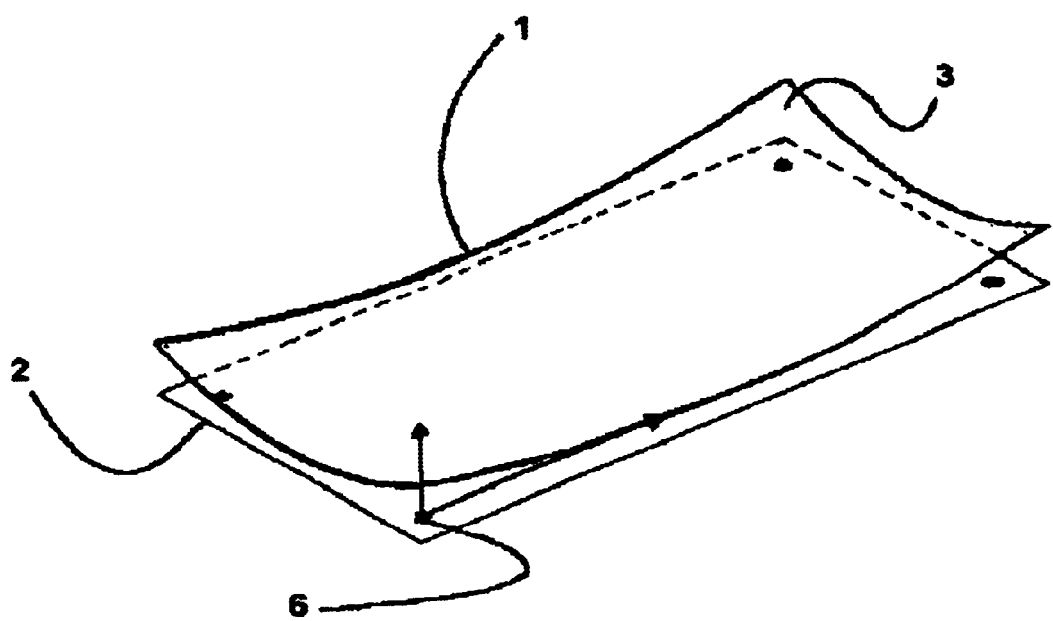

DEVICE FOR SEPARATING, LIFTING AND MOVING ALUMINIUM SHEETS OR OTHER NON-FERROMAGNETIC MATERIAL

OBJECT OF THE INVENTION

The object of the present invention, as shown by its title, is related to a device for separating, lifting and transporting sheets of aluminium or other non-ferromagnetic material as shown by its name used for feeding cutting and ironing lines, aluminium component transfer lines, etc.

BACKGROUND

When dealing with a pile of sheets and trying to lift the top one with the help of a vacuum system it is often the case that, due to the adherence of the sheets, several are lifted at a time.

In iron or ferromagnetic sheets this problem has been solved by putting magnets on the sides of the piles of sheeting, which separate the edges of the top sheets. Thus, with a slight separation between the sheets, even if only at the edges, when vacuumed, only the first sheet is picked up and not the others.

If one wishes to work only with non-ferromagnetic sheets, this problem cannot be solved by magnets alone, since they are not at all magnetised, so it is necessary to use mechanical solutions which encumber the manipulation of said sheets and generally lower performance of the installations for manipulating and transporting sheeting, and therefore the performance of all processes that follow.

DESCRIPTION OF THE INVENTION

In order to eliminate the aforementioned drawbacks, the device for separating, lifting and transporting sheets of aluminium or other non-ferromagnetic material has been developed. Said device is based on the physical fundament of Lorentz force. This force is manifested in electrically charged particles that move and, the magnetic field which said particles are within, according to the corkscrew law. Its mathematical expression is $F=q \cdot (v \times B)$, where q is the electrical charge, v its velocity, and B the magnetic field at the point where the charge is located.

A metal is a medium where electrons can circulate relatively easily, that is, a large amount of current can be sent through with a moderate or very small Joule. Therefore, if we make a small electrical current (electrically charged particles in movement) pass through a thin metal sheet in a certain direction and apply a magnetic field perpendicular to the direction of said electrical current and coplanar to the surface of the sheet, we generate a force of attraction directed towards the direction perpendicular to the sheet. This perpendicular force is that which will make the sheet lift.

Putting this observation into practice, if we make an electrical current circulate, with metallic electrodes, in the surroundings of the two longer sides of a rectangular shaped metal sheet, while at the same time, by way of permanent magnets we provoke a magnetic field between the contact electrodes, we generate forces of attraction on the aluminium sheet that provide the lifting of said sheet.

The electrical current is distributed all around the sheet, but there are areas where it circulates more intensively than others, specifically along the imaginary lines that join the contact points with the electrodes, reaching the highest values at these very points and consequentially, it is where more force of attraction is generated on the sheet.

According to the theoretical principle shown above, and the practical observations made, the device for separating, lifting and transporting sheets aluminium or other non-ferromagnetic materials is made up of a spider attraction assembly and the electrical supply system.

The spider attraction assembly is a rectangular metal housing, made of any non-ferromagnetic material, of dimensions similar to those of the aluminium sheeting that it will be manipulating. On the two longer sides, a series of blocks of magnets are arranged in linear fashion; at the beginning and the end of the row of blocks of magnets said spider assembly is provided with two retractable cylindrical metal electrodes (which retract when they are pressed on the sheet of aluminium) that end in a square, flat surface of 30 to 50 mm. sides in order to improve transmission of the electrical current.

The blocks of magnets are made up of a number of magnets between 8 and 12 encapsulated by a metal box, preferably iron, leaving a strip uncovered over the union of two magnets generating a magnetic flow in the same direction in all the blocks. Said blocks of magnets have a width of between 50 and 70 mm., a length of between 60 and 120 mm. and the stack thickness of between 30 and 60 mm.

The rectified electrical current supply system is able to supply electrical currents between 100 and 500 A and power between 1,200 and 1,500 W.

DETAILED DESCRIPTION OF THE DRAWINGS

In order to facilitate a better understanding of the object of the present invention, a preferred practical embodiment of the device for separating, lifting and transporting sheets of aluminium or other non-ferromagnetic material, object of the present invention, is described below based on the attached figures:

FIG. 1 Isometric view of a sheet of aluminium where the lifting of the edges can be seen.

Figure 2:
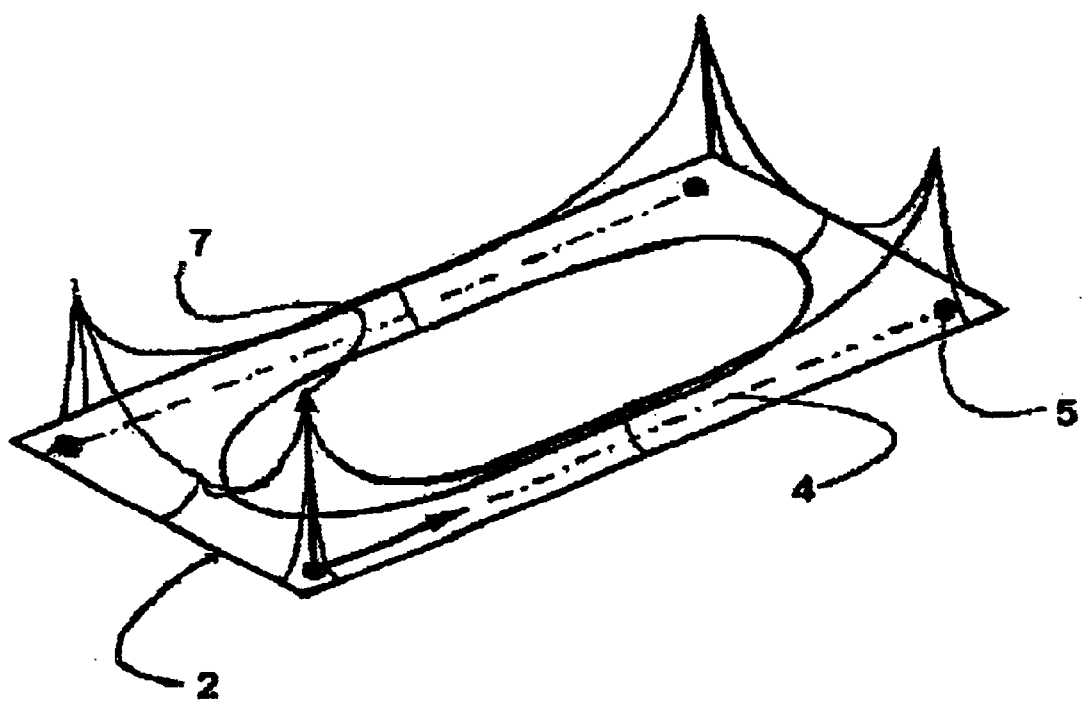

FIG. 2 Isometric view of the diagram of the distribution of forces of attraction on a sheet of aluminium.

Figure 3:
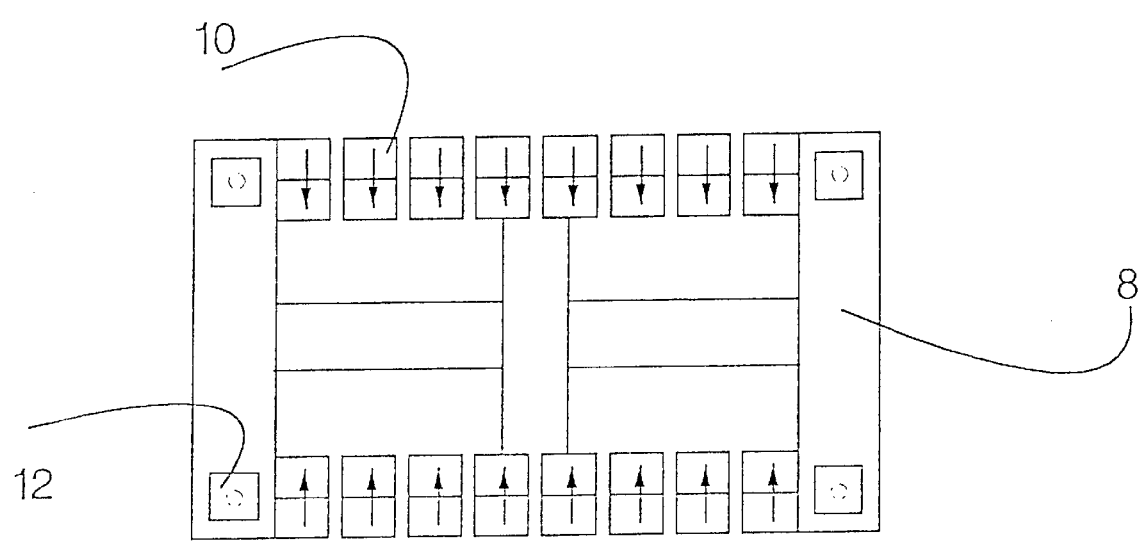

FIG. 3 Inverted plan view of the spider attraction assembly of the device for separating, lifting and transporting sheets of aluminium or other non-ferromagnetic material.

Figure 4:
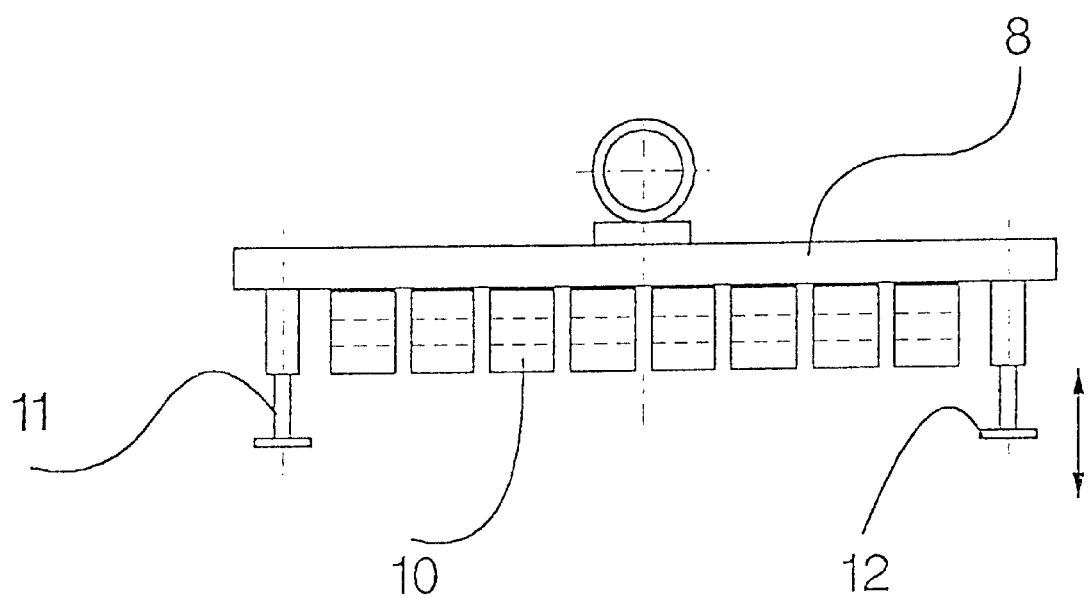

FIG. 4 Front view of the spider attraction assembly of the device for separating, lifting and transporting sheets of aluminium or other non-ferromagnetic material.

Figure 5:
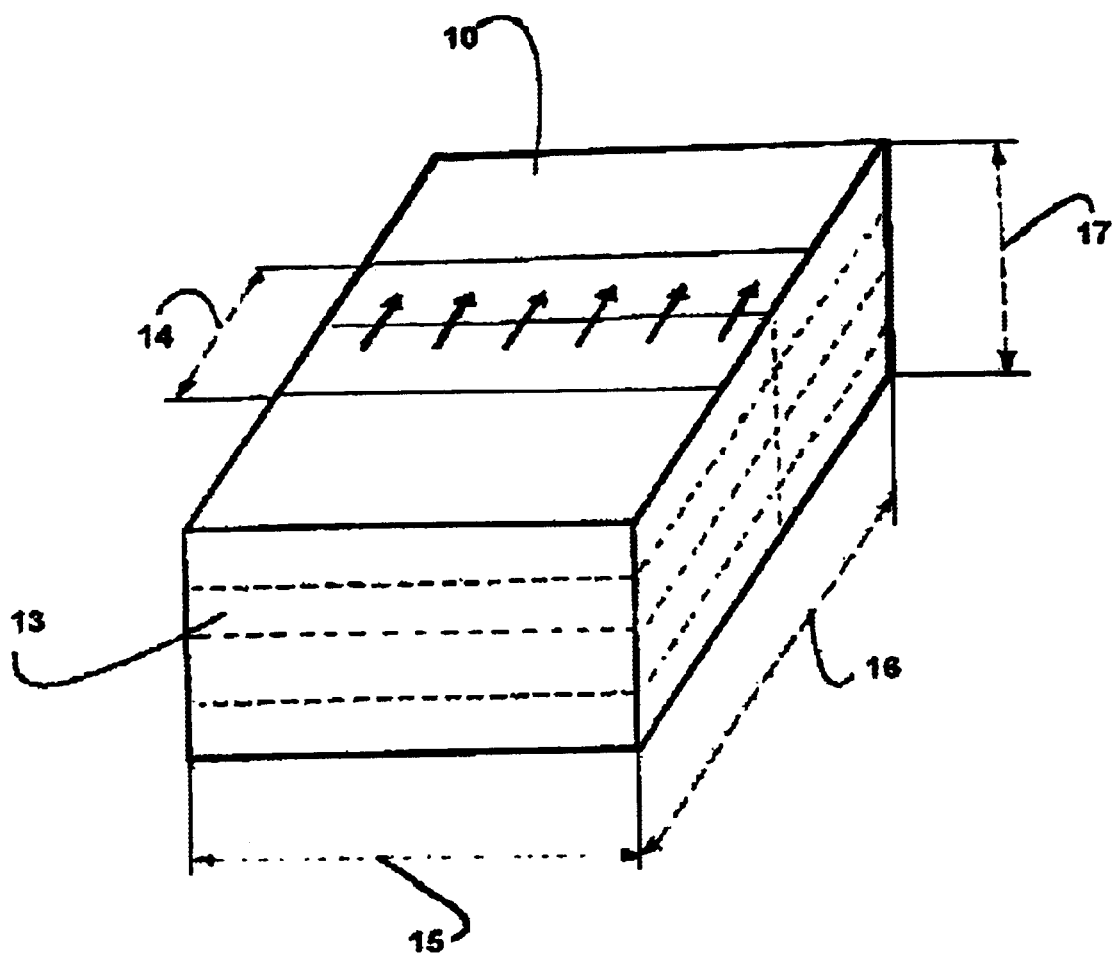

FIG. 5 Isometric view of the block of magnets.

Figure 6:
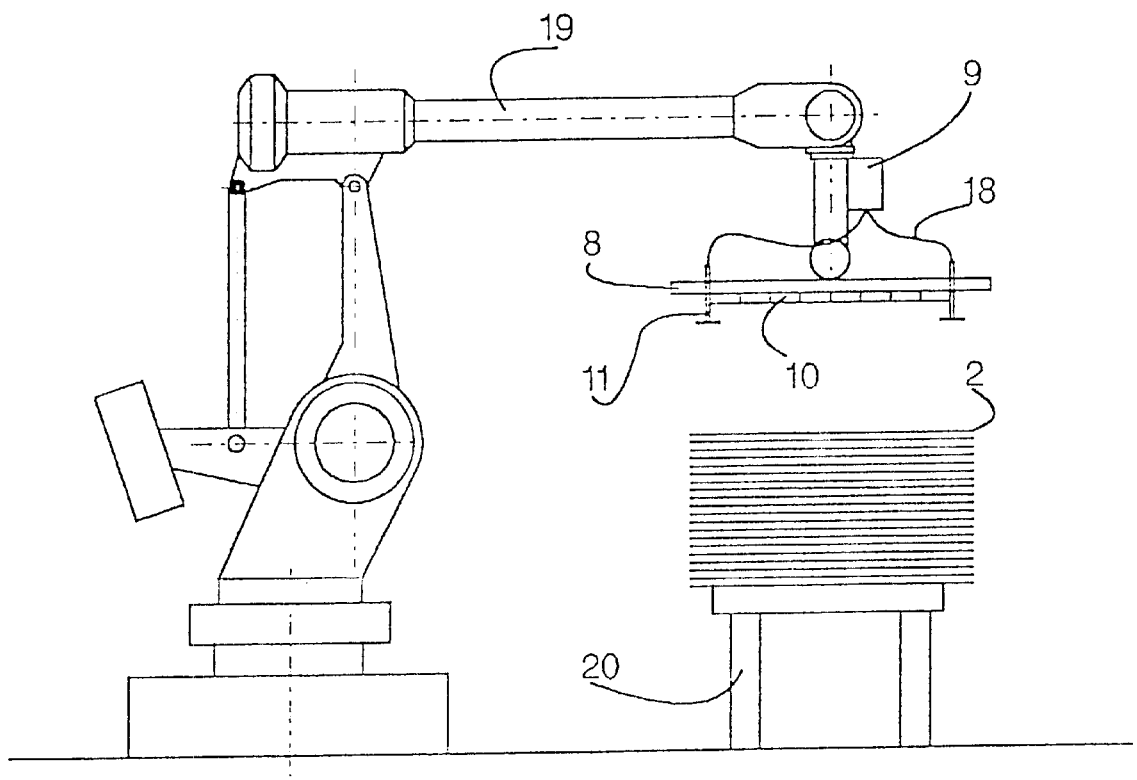

FIG. 6 Front view of the spider attraction assembly installed under a robotized arm over a block of aluminium sheeting arranged for attraction.

PREFERRED EMBODIMENT OF THE INVENTION

The device for separating, lifting and transporting sheets of aluminium or other non-ferromagnetic material is based on the physical fundament of Lorentz force. This force is manifested in electrically charged particles that move, and it is a force perpendicular to the plane formed by the velocity at which the electrical charges move and the magnetic field which said particles are within, according to the corkscrew principle. Its mathematical expression is $F=q \cdot (v \times B)$, where q is the electrical charge, v its velocity, and B the magnetic field at the point where the charge is located.

If by way of metal electrodes an electrical current is made to circulate in the surroundings of the two longer sides (1) of a rectangular sheet (2) of aluminium while at the same time, by way of permanent magnets, we provoke a magnetic field between the contact electrodes, we generate forces of attraction (3) on the sheet (2) of aluminium which provide the lifting of the sheet (2).

The electrical current is distributed all over the sheet (2), although there are some areas in which it tends to circulate more intensively than in others, specifically along the imaginary lines (4) that join the contact points (5) to the electrodes, reaching larger values (6) at these same points and as a consequence it is where more force of attraction (7) is generated on the sheet.

According to the theoretical principle shown above and the practical observations made the device for separating, lifting and transporting sheets of aluminium or other non-ferromagnetic material is composed of a spider attraction assembly (8) and the electrical supply system (9).

The spider attraction assembly (8) is a rectangular metal housing, made of any non-ferromagnetic material, of dimensions similar to those of the aluminium sheets (2) that it will be manipulating. Along the two longer sides a series of magnets are arranged; and at the beginning and the end of the row of blocks of magnets (10), said spider assembly is provided with two cylindrical metal retractable electrodes (11) (which retract when pressed onto the aluminium sheet (2)) that end in a square, flat surface (12) with sides of 30 to 50 mm. in order to improve the transmission of the electrical current.

The blocks of magnets (10) are made up of a number of magnets between 8 and 12 (13) encapsulated by a metal, preferably iron, box leaving a strip (14) uncovered over the union of the magnets generating a magnetic flow in the same direction in all of the blocks. Said blocks of magnets (10) have a width (15) between 50 and 70 mm., a length (16) between 60 and 120 mm. and thickness of the packet (17) of between 30 and 60 mm.

The rectified electrical current supply system (9) with the conductors (18) is installed hanging from a robotized arm (19) with capacity for movement along the three axes of symmetry in order to attract the sheets of aluminium (2) located on horses (20).

When the robotized arm (19) descends to approach the spider attraction assembly (8) to the packet of sheets of aluminium (2) so that the retractable electrodes (11) make contact with the first sheet (2), causing the current generated by the electrical supply system (9) to pass through the edges (1) of said sheet (2) making said edges (1) be attracted by the blocks of magnets (10) so that a separation is made between the upper sheet and the one immediately underneath it without becoming adhered to the sheet immediately underneath it.

Having sufficiently described the nature of the present invention, as well as a way of putting it into practices, we only need add that it is possible to introduce variations in the shape, materials, and disposal in the whole and each of the parts that constitute it, as long as said variations do not substantially alter the characteristics of the invention as claimed below.

What is claimed is:

1. Device for separating, lifting and transporting sheets of aluminium or other non-ferromagnetic material consisting of a spider attraction assembly (8) and an electrical supply system (9), characterised in that the spider attraction assembly (8) is a rectangular metal housing, made of any non-ferromagnetic material, with dimensions similar to those of the sheets of aluminium (2) to be manipulated, having a series of blocks of magnets (10) arranged linearly along the two longer sides of the rectangle forming said housing; said spider assembly being provided, at the beginning and end of the row of blocks of magnets (10), with two cylindrical metal retractable electrodes (11) that end in a flat, square surface (12) of 30 to 50 mm. sides in order to improve the transmission of the electrical current, connected to the electrical supply system (9) by way of electrical conductors (18), said spider assembly being provided with the capacity to attract sheets of aluminium when an electrical current is made to circulate in the surroundings of the edge (1) of a sheet (2) of aluminium while at the same time the edge (1) is under the action of a magnetic field, since said sheet is attracted by a force-field (7) when an electrical current is made to circulate through its edges (1) while at the same time said edges (1) are under the action of a magnetic field.

2. Device for separating, lifting and transporting sheets of aluminium or other non-ferromagnetic material which, in accordance with claim 1, is characterised in that the blocks of magnets (10) are made up of a number of magnets (13) encapsulated by a metal box, leaving a strip (14) uncovered over the union of the magnets generating a magnetic flow in the same direction in all of the blocks; said magnets (10) having a width (15) of between 50 and 70 mm., a length (16) between 60 and 120 mm., and a stack thickness (17) between 30 and 60 mm.

\* \* \* \* \*